Jan. 23, 1962  B. H. KRYZER  3,017,995
WATER SOFTENER CONTROLS
Filed Oct. 8, 1956  2 Sheets-Sheet 1

INVENTOR
BENJAMIN H. KRYZER
BY John E. Stryker
ATTORNEY

Jan. 23, 1962  B. H. KRYZER  3,017,995
WATER SOFTENER CONTROLS
Filed Oct. 8, 1956  2 Sheets-Sheet 2
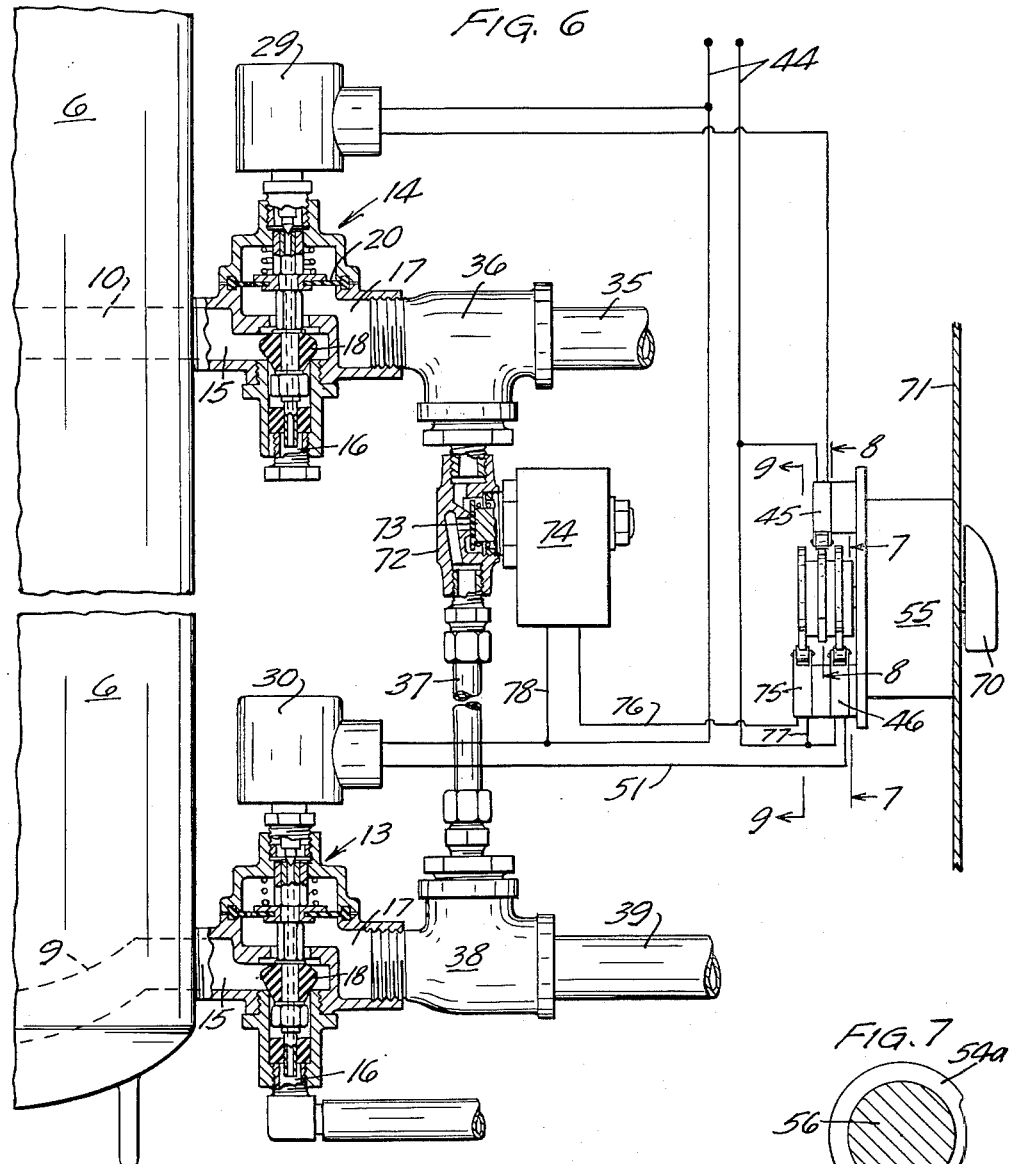
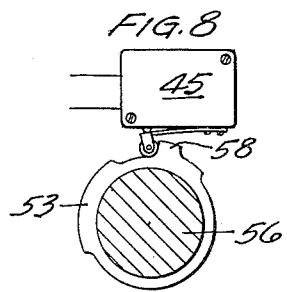
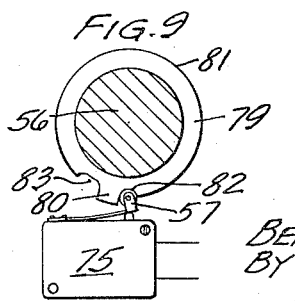
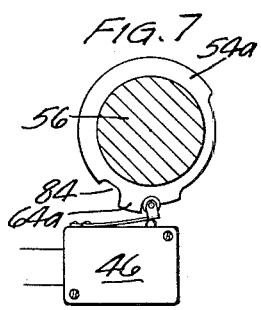
INVENTOR
BENJAMIN H. KRYZER
BY John E. Stryker
ATTORNEY United States Patent Office 3,017,995
Patented Jan. 23, 1962

3,017,995
WATER SOFTENER CONTROLS
Benjamin H. Kryzer, St. Paul, Minn., assignor, by mesne assignments, to Union Tank Car Company, Chicago, Ill., a corporation of New Jersey
Filed Oct. 8, 1956, Ser. No. 614,639
4 Claims. (Cl. 210—138)

This invention relates to controls for flow of fluids through tanks and particularly to improved controls for water softeners of the type requiring periodic regeneration and backwashing of a body of softening material contained in a tank.

It is an object of my invention to provide novel, simple and reliable controls including a pair of similar main valves adapted to be activated by electro-magnetic means through a cycle which includes periods for regenerating, backwashing and flushing of predetermined duration followed by a return to softening service automatically.

A further object is to provide controls of the character described adapted to reverse the direction of flow through the tank automatically for backwashing of predetermined duration under control of a pair of main valves and a pressure reducing valve.

A particular object is to provide such controls comprising duplicate main valves of the three-port two-way type which are operated by fluid pressure responsive means under control of solenoid operated auxiliary valves.

A further and particular object is to provide controls of the class described comprising a pair of main valves of the three-port two-way type and a one-way valve disposed to coact with the main valves during backwashing, each valve being under control of electrically energizable means included in circuits with switches operated by time control means.

My invention also includes certain novel features of construction of the main valves and their operating mechanism whereby these valves are particularly adapted to control flow through tanks for water softeners, filters and other fluid treating apparatus.

Referring to the accompanying drawings which illustrate preferred and modified forms of my improved controls:

Figure 1:
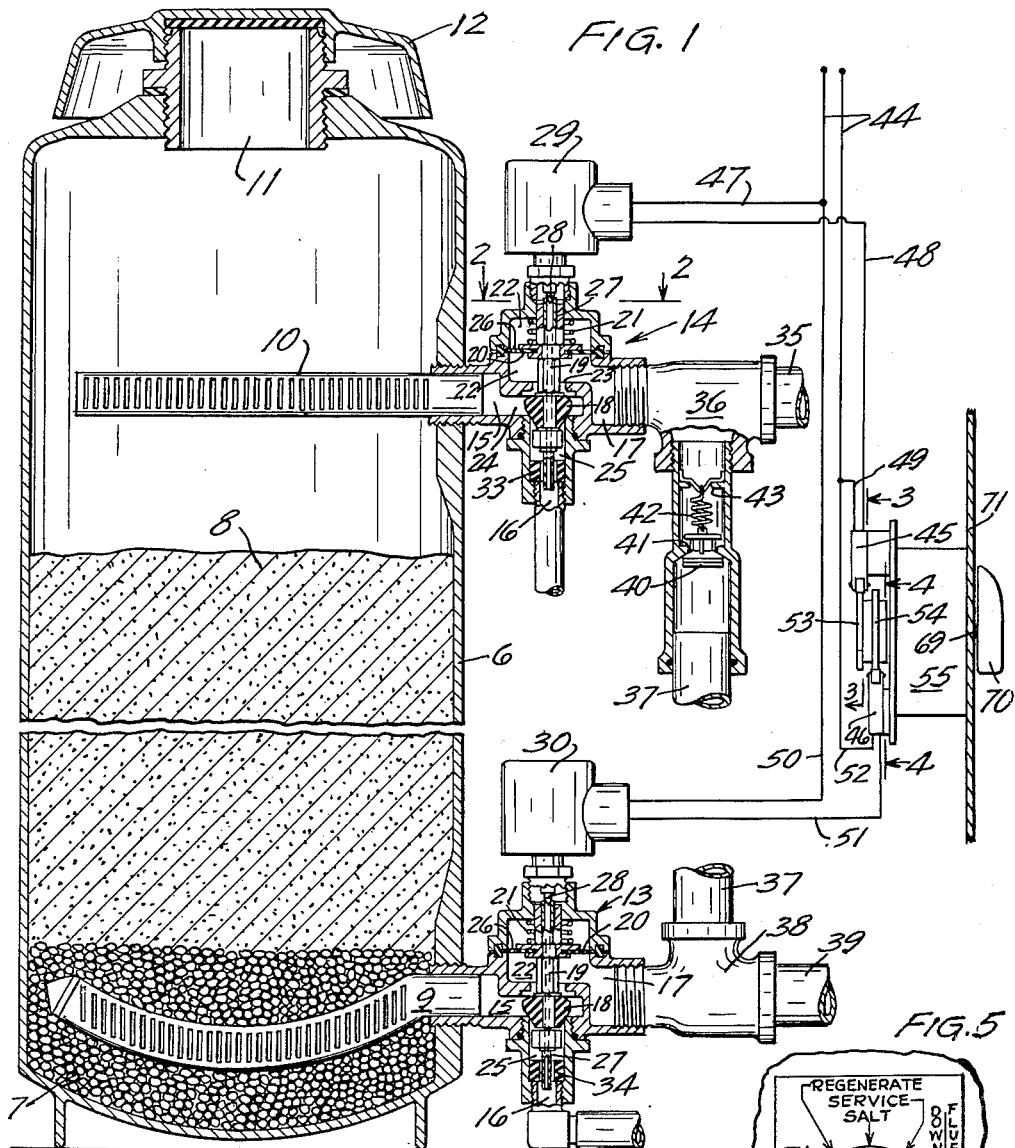
FIGURE 1 is a part vertical sectional view and part side elevational view showing a water softener having a preferred form of my improved controls.
Figure 5:
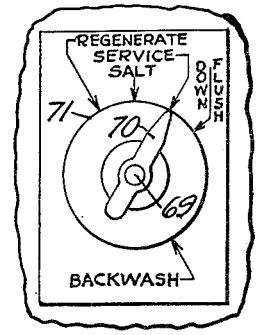
Figures 3, 4:
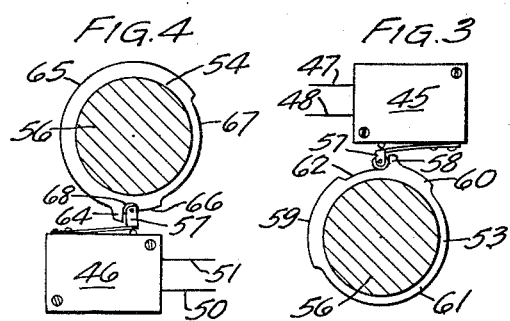

FIGS. 3 and 4 are sections taken on the lines 3—3 and 4—4 respectively of FIG. 1, showing a pair of electric switches and the cams for severally operating them through a predetermined cycle;

FIG. 5 is a front elevational view of the timing mechanism, showing particularly the dial and hand operated control;

FIG. 6 is a part side elevational view and part vertical sectional view showing a modification of the controls, and FIGS. 7, 8 and 9 are sectional views taken respectively on the lines 7—7, 8—8 and 9—9 of FIG. 6, showing switches for the modified controls together with timer actuated cams for actuating the several switches.

As shown in FIG. 1, my controls are connected to a tank 6 containing a bed of gravel 7 in the bottom and water softening material 8 supported on the bed 7. Communicating with the lower portion of the tank is a distributor 9 of conventional form and a second distributor 10 communicates with the upper portion of the tank. At the top, the tank is provided with a filling neck 11 and a removable cap 12. Regenerating material, usually in granular or pellet form, may be charged into the top of the tank through the filling neck 11 as required and in accordance with conventional practice in the water softening art.

My improved controls include similar main valves indicated generally by the numerals 13 and 14 controlling the flow to and from the distributor pipes 9 and 10 respectively. These valves are of the three-port, two-way type each having a tank connected port 15, a waste outlet port 16 and a third port 17. Since the valves 13 and 14 are alike, a description of details of one will be sufficient for an understanding of both.

Each of the valves 13 and 14 has a head 18 which controls the direction of flow between the several ports. This head is of the type known as a bib washer and is connected by a stem 19 to a diaphragm 20. A coiled spring 21 biases the stem 19 axially downward so that the head 18 is normally closed against a lower annular seat to cut off flow to the waste outlet port 16. Above the head there are a first chamber 22 containing the diaphragm 20 and a passage 23 adapted to be closed by the head when in its raised position. A second chamber 24 contains the head 18 and there is a third chamber 25 below the lower seat in continuous communication with the port 16.

When the head 18 is closed at its upper seat communication is established between the tank connected port 15 opening into chamber 24 and waste outlet port 16 opening into chamber 25. Also when in this position flow to and from port 17 through passage 23 is cut off. Chamber 22 is in continuous communication with port 17 and diaphragm 20 divides the chamber 22 into upper and lower compartments. These compartments are connected by a restricted passage formed by a minute hole 26 in diaphragm 20 so that fluid pressure may be equalized at the upper and lower sides of the diaphragm when the valve is in its normal or first position shown.

Figure 2:
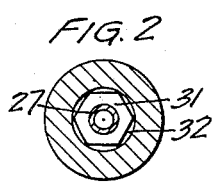
FIG. 2 is a horizontal sectional view taken on the line 2—2 of FIG. 1.

Extending axially through central openings in diaphragm 20, stem 19 and head 18 and through chambers 22 and 25 is a small tube 27. This tube is in continuous communication at its lower end with the waste outlet port 16. At its upper end the tube 27 of valve 14 is formed with a seat for an auxiliary valve 28 which is operatively connected to the plunger of a solenoid contained in a housing 29. Valve 13 has a similar auxiliary valve connected to the plunger of a solenoid in a housing 30. As indicated in FIG. 2, the tube 27 extends through an axial bore in a hexagonal member 31 and at the sides of this member there is a passage 32 which allows flow from the upper compartment of chamber 22 to the upper end of the tube 27 when auxiliary valve 28 is open. Thus when the auxiliary valve 28 is raised from its seat at the upper end of the tube 27 flow is established from the upper compartment of chamber 22 through tube 27 to waste port 16.

Mounted in the chamber 25 of valve 14 is a flow control device 33 constructed from resilient compressible material and having a central passage surrounding the lower end portion of the tube 27. This device 33 permits flow from the chamber 25 to the port 16 at a controlled rate. Similarly, the valve 13 has a flow control device 34 restricting flow from its chamber 25 to its waste outlet port 16. This central passage through the control device 34 controls the rate of flow to waste during regeneration and is somewhat smaller than the corresponding passage through the device 33 of the valve 14 which controls the rate of flow to waste during backwashing.

Fluid under pressure, e.g., hard water to be softened, may be supplied through a pipe 35 connected to a fitting 36 having a branch in continuous communication with port 17 of valve 14. From another branch of the fitting 36 fluid may be fed through a conduit 37 to a fitting 38 having a branch communicating with port 17 of valve 13.

Another branch of fitting 38 is connected to a service outlet pipe 39. Flow through conduit 37 shown in FIG. 1 is under control of a valve 40 of the pressure reducing type. This valve also performs the function of a check valve, allowing flow through conduit 37 to fitting 38 but not in the reverse direction. Thus valve 40 is normally closed at an annular seat 41 and is biased toward closed position by a spring 42 anchored at its upper end on an annular flange 43 formed in the valve casing. Spring 42 allows valve 40 to open when pressure of fluid above the valve is substantially higher than that of fluid below the valve in the conduit 37. For example, if the pipe 35 should supply water at a pressure of approximately 20 pounds per square inch, spring 42 may be designed to allow a pressure differential of approximately 10 pounds between the pressures at opposite sides of valve 40. It will be evident that the tension exerted by the spring should be adjusted to suit the pressure of the available water supply, with a view to cutting off flow through the conduit 37 during water softening operation and permitting such flow at other times when the head 18 of valve 14 is closed at its upper seat.

Electric circuits and a pair of switches are provided to energize the solenoids contained in the housings 29 and 30. As indicated diagrammatically in FIG. 1, a current supply circuit includes wires 44 and switches 45 and 46 are included in branch circuits disposed to severally energize the solenoids under control of the switches. A branch circuit for energizing the solenoid in housing 29 includes wires 47, 48, the switch 45 and a wire 49. Switch 46 is included in a branch of the current supply circuit including the solenoid in the housing 30, and wires 50, 51 and 52.

Both of the switches 45 and 46 are normally open and cams indicated generally at 53 and 54 are provided for actuating them to closed position. These cams are operatively connected to a timer indicated generally at 55 and are fixed on a shaft 56 adapted to be turned by the timer. Each of the switches 45 and 46 carries a spring biased follower 57 for rolling contact with the periphery of the associated cam. Projecting from the periphery of the cam 53 is a stop finger 58 and this cam has arcuate raised segments 59 and 60 separated by arcuate segments 61 and 62 of smaller radius. The cam 56 has a stop finger 64 and spaced raised segments 65 and 66 separated by arcuate segments 67 and 68 of smaller radius.

It will be evident that switch 45 is open when its follower 57 is supported on either of the segments 61 and 62 of cam 53 and is closed when its follower is supported on either of the segments 59 and 60. Switch 46 remains open when its follower 57 is supported on segment 67 or 68 of the cam 54 and is closed when its follower is supported on segment 65 or 66. The duration of the regenerating, backwashing and downflushing periods is determined by the arcuate lengths of the several cam segments and the sequence of the several operations is also determined by the cam formations.

Suitable clock mechanism is provided to operate the timer 55. Where this mechanism is of the spring actuated type adapted to be wound manually it is provided with a spindle 69 carrying a pointer hand 70 adapted to be rotated in relation to a dial 71 having legends indicating the several points on the dial where the various timed operations are to start. As shown, the dial is calibrated and marked with legends showing the starting points for "Salt," "Regenerate," "Backwash," "Downflush" and "Service," reading counter-clockwise from the top. This timer 55 may be of the type described in the application of B. H. Kryzer and T. W. Techler, Serial No. 491,452, filed March 1, 1955. It is a characteristic of such timers that the clock mechanism is stopped when in the "Service" position.

As shown in FIG. 6, the modified control has a solenoid actuated valve indicated generally at 72 in place of the valve 40 of the pressure reducing type for controlling flow through the conduit 37. Valve 72 has a movable head 73 which is spring biased to normally cut off flow through the conduit 37 and a solenoid in a housing 74 is operatively connected to the head 73 so that the passage through the conduit 37 is open when the solenoid is energized. The coil of this solenoid is included in a circuit under control of a switch 75 (FIGS. 1 and 9). Conductors for this circuit include a wire 76 connecting the switch 75 to the solenoid for valve 72 and branch wires 77 and 78 extending to the current supply wires 44 respectively.

A cam 79 (FIG. 9) is provided to actuate the switch 75. This cam, like the cams for actuating the switches 45 and 46, is fixed on the shaft 56 of the timer 55. Projecting from the periphery of the cam 79 is a finger 80 adapted to stop rotary movement of the cam when this finger engages the follower 57 of switch 75. The periphery of the cam 79 has an elongated segment 81 adapted to actuate the follower 57 to close the switch 75. At one end of the segment 81 there is a recess 82 adapted to receive the follower 57 and at the other end a short segment 83 of reduced radius is disposed to receive the follower 57 and allow the switch 75 to open when the cam is in the salting position hereinafter described.

For the modification shown in FIGS. 6–9 there are switches 45 and 46 for energizing circuits including the solenoids in the housings 29 and 30 respectively. These switches are similar to those shown in the preferred controls of FIG. 1 and cams for actuating these switches for the modified construction are generally similar to those of the preferred construction. There is one minor departure from the latter in that the modified construction has a cam 54a formed with a short segment 84 of reduced radius adjacent to a stop finger 64a to receive the follower of the switch 46 when the cam is in the salting position. Otherwise the cam 54a is similar to the cam 54. The cam 53 of the modified construction is identical with that hereinbefore described for actuating the switch 45. Other elements of the controls for the modified construction including the main valves 13 and 14, and their actuating mechanism, the timer 55, pointer hand 70 and dial 71 are like those described with reference to FIGS. 1 and 5.

*Operation*

In the drawings the several controls are shown in the positions they occupy during the normal service operation. The timing mechanism is stopped and the cams 53 and 54 are stationary with the followers 57 in contact with the cam fingers 58 and 64 shown in FIGS. 3 and 4. In the modified controls the followers for switches 46, 45 and 75 are in contact with cam fingers 64a, 58 and 80. Water entering through the pipe 35 and fitting 36 passes through the valve 14, via its port 17, chamber 22, passage 23, chamber 24 and port 15, to distributor 10 and flows downwardly through the softening material 8 and gravel supporting bed to the distributor 9, thence to valve 13 at its port 15 and then through its passage 23, chamber 22 and port 17 to fitting 38 and service pipe 39.

When regeneration of the material 8 is required, the hand 70 of the timer 55 is turned clockwise to the position on the dial 71 marked "Salt." This turns the cam 53 to a position in which the follower 57 is raised by the cam segment 60 adjacent to the stop finger 58, thereby closing the switch 45. Switch 46 (FIGS. 1 and 4) is also closed by the "Salt" setting as a result of the turning of the cam 54 to a position in which the follower 57 is in contact with the elevated segment 65 near the stop finger 64. Closing of the switches 45 and 46 of the controls shown in FIGS. 1–5 causes the solenoids in the housings 29 and 30 to be energized, thereby opening the auxiliary valves 28 of the main valves 13 and 14. This places the upper compartment of each of the chambers 22 in communication with the waste outlet port 16 of each main valve through axial tube 27. Since the waste outlets are substantially at atmospheric pressure, pressure of fluid in the upper compartment of chamber 22 is thereby reduced and the greater pressure exerted on the lower side of the diaphragms 20 causes the valve heads 18 to be closed at their upper seats wherein the passages 23 are closed. This also opens the passage from both tank connected ports 15 to the waste outlet ports 16 to drain off some of the water from the tank.

Cap 12 is now removed from the filling neck 11 and a predetermined quantity of regenerating material, usually common salt in granulated or pellet form, is poured in through the filling opening upon the upper surface of the softening material 8. Then the cap 12 is returned to its closed, sealing position.

To start regeneration and complete cycle of reconditioning of the softener, the hand 70 is turned from the "Salt" position counter-clockwise to the "Regenerate" position indicated on the dial 71. This causes the solenoid in housing 29 to be deenergized and the solenoid in housing 30 to remain in its energized condition due to the turning of the cams 53 and 54 counter-clockwise so that the followers 57 for the switches 45 and 46 are severally supported on the segments 61 and 65 of the cams. By thus deenergizing the solenoid for operating the auxiliary valve 28 of the main valve 14, this auxiliary valve is caused to close the upper end of the tube 27 of this valve. Flow through the hole 26 in the diaphragm now equalizes pressure in the upper and lower compartments of the chamber 22 and spring 21 closes the head 18 of the valve 14 at its lower seat. This allows water for regeneration to flow from port 17 to port 15 of valve 14 so that flow is started into the upper portion of the tank 6 through the distributor 10. The solid regenerating material deposited on the softening material 8 is thereby dissolved and is carried through the body of softening material to the distributor 9, as brine. Since valve 13 is in its position for establishing flow from its tank connected port 15 to its waste outlet port 16, the spent brine passes from the distributor 9 to the waste outlet port 16 at a rate which is controlled by the device 34.

Regeneration continues while the timer mechanism moves the hand 70 and cams 53 and 54 counter-clockwise. When cam 53 has turned to the position where the follower 57 of the switch 45 is engaged by the leading end of segment 59, switch 45 is closed to cause the closing of passage 23 of valve 14. At the same time, cam 54 carries the leading end of its segment 67 into engagement with the follower of switch 46, thereby allowing this switch to open, deenergizing the solenoid control for valve 13, and allowing the spring 21 to close this valve at its lower seat. This opens the passage between ports 17 and 15 of valve 13 for the backwashing operation which follows.

With the controls shown in FIG. 1, pressure now builds up in the fitting 36 above the valve 40 until this valve opens and allows flow through the conduit 37, fitting 38 and valve 13, via its port 17, passage 23 and port 15, to the distributor 9 in the lower portion of the tank. The backwashing operation is thus started and continues for a predetermined period of time while the sediment removed from the water softening material 8 flows out through the distributor 10 and valve 14 to waste outlet port 16 of this valve through flow control device 33.

Backwash is terminated by the passing of segment 59 of cam 53 out of engagement with follower 57 of switch 45 and passage of segment 67 of cam 54 out of engagement with follower of switch 46. Switch 45 is thereby caused to open with its follower on the leading end of segment 62 of cam 53 and switch 46 is closed with its follower on the leading end of cam segment 66. The opening of switch 45 causes valve 14 to open communication between its ports 17 and 15 and to close the passage to its waste outlet port 16. Closing switch 46 causes valve 13 to open communication between its tank connected port 15 and its waste outlet port 16 and to close its passage 23. A downflushing treatment of the softening material 8 is thus started and continues for a predetermined short period of time.

Downflushing treatment is terminated when segment 66 of cam 54 allows the follower of switch 46 to enter the recess formed by segment 68. Valve 13 is thereupon returned to its service position wherein its waste outlet port is closed and flow is established from its tank connected port 15 to its third port 17 communicating with service pipe 39. Switch 45 remains open with its follower on the trailing end of segment 62. This completes the cycle of operation and the clock mechanism is stopped with the cams 53 and 54 in the positions indicated in FIGS. 3 and 4 respectively in relation to the switches 45 and 46.

With the modified controls shown in FIGS. 6–9, the operation of the hand 70 in relation to the dial 71 corresponds to that hereinbefore described and the main valves 13 and 14 are operated in a similar manner except that during salting the valve 13 is retained in its normal position shown in FIG. 6 as a result of the deenergization of its control solenoid caused by the engagement of the follower 57 of switch 46 with the segment 84 of cam 54a (FIG. 7). Switch 75 controlling valve 72 is also held open when hand 70 is turned to the "Salt" position. This is caused by engagement of the follower for switch 75 with segment 83 of cam 79 (FIG. 9). After the salting when the timer hand 70 is turned to "Regenerate" segment 81 of cam 79 closes switch 75 and this switch is retained in its closed position throughout the regenerating, backwashing and downflushing operations. Thus the solenoid in housing 74 is energized and valve 72 remains open during these operations. During regeneration this valve functions to supply hard water to the service pipe 39. During backwashing, valve 13 being open at its upper seat, hard water flows from fitting 36 through open valve 72, conduit 37, fitting 38 and ports 17 and 15 of valve 13 into the lower portion of the tank 6. Further details of the several treatment steps will be evident from the foregoing description of the controls shown in FIGS. 1–5.

My improved controls embody a number of advantageous features. They require a minimum of power to operate them automatically due to the employment of a pair of solenoid actuated auxiliary valves controlling hydraulically operated main valves. They are simple to operate requiring no manually operated valves for controlling either the start or termination of the regenerating, backwashing or downflush treatment. My pressure reducing valve 40 which automatically controls the flow to port 17 of valve 13 further simplifies the installation. The modification shown in FIGS. 6–9 requires an additional electrically energized valve 72 under control of the third switch 75 and its actuating cam on the timer shaft.

Such automatic control of the duration of the several regenerating, backwashing and downflush steps has particular advantages where the controls are used for domestic softeners where the owners and operators seldom fully understand the construction and operation of the apparatus. To recondition the softener, the operator is required to make only a single trip to it for the start of the reconditioning cycle including the setting of the timer which automatically starts and determines the several treatment steps and causes the return to service operation.

I claim:

1. A flow control comprising, a first valve having a movable head, a tank connecting port, a waste outlet connecting port and a third port connected to a source of fluid under pressure; a second valve having a movable head, a tank connecting port, a waste outlet connecting port and a third port, means biasing each of said valve heads to a first position in which said waste outlet connecting ports are closed, said third port of the first valve is in communication with the tank connecting port of the first valve, and the tank connecting port of the second valve is in communication with its third port; independently activatable fluid pressure responsive means operatively connected to said first and second valve heads respectively for selectively actuating said heads to a second position, said first valve head when in the second position closing its third port and placing its tank connecting port in communication with its waste outlet connecting port and the second valve head when in the second position placing its tank connecting port in communication with its waste outlet connecting port and closing its third port; a conduit connecting said third port of the first valve to said third port of said second valve, valve means controlling flow through said conduit; and electro-magnetic means for selectively activating said fluid pressure responsive means to severally move said valve heads to said second positions.

2. A control in accordance with claim 1 wherein said valve means controlling flow through said conduit comprises a valve permitting flow at a predetermined pressure differential to said third port of the second valve and preventing flow in the reverse direction through said conduit.

3. A control in accordance with claim 1 wherein said valve means controlling flow through said conduit comprises a third normally closed valve, and electro-magnetic means for actuating said third valve to open position.

4. A flow control in accordance with claim 1 in which each of said first and second valves comprises a three-port, two-way valve.

References Cited in the file of this patent

UNITED STATES PATENTS

| | | |
|---|---|---|
| 2,265,225 | Clark | Dec. 9, 1941 |
| 2,347,201 | Lindsay | Apr. 25, 1944 |
| 2,498,189 | Wattson | Feb. 21, 1950 |
| 2,596,915 | Pick | May 13, 1952 |
| 2,601,989 | Modes | July 1, 1952 |
| 2,607,728 | Albertson | Aug. 19, 1952 |
| 2,653,659 | Bloom | Sept. 29, 1953 |
| 2,670,328 | Webb | Feb. 23, 1954 |
| 2,689,006 | Lindsay | Sept. 4, 1954 |
| 2,722,514 | Sloan | Nov. 1, 1955 |
| 2,738,807 | Addison | Mar. 20, 1956 |
| 2,739,119 | Stoner | Mar. 20, 1956 |
| 2,786,697 | Kryzer | Apr. 23, 1957 |
| 2,796,061 | Buchanan | June 18, 1957 |
| 2,796,177 | Kryzer | June 18, 1957 |